(12) United States Patent
He et al.

(10) Patent No.: US 11,556,719 B2
(45) Date of Patent: Jan. 17, 2023

(54) DIALOGUE INTERACTION METHOD AND APPARATUS, DEVICE, AND STORAGE MEDIUM

(71) Applicants: Baidu Online Network Technology (Beijing) Co., Ltd., Beijing (CN); SHANGHAI XIAODU TECHNOLOGY CO. LTD., Shanghai (CN)

(72) Inventors: Wensong He, Beijing (CN); Yafei Miao, Beijing (CN); Qichao Tang, Beijing (CN); Ben Xu, Beijing (CN); Jian Xie, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 77 days.

(21) Appl. No.: 17/020,160

(22) Filed: Sep. 14, 2020

(65) Prior Publication Data

US 2021/0209312 A1   Jul. 8, 2021

(30) Foreign Application Priority Data

Jan. 8, 2020   (CN) .......................... 202010017420.6

(51) Int. Cl.
*G10L 15/26*   (2006.01)
*G06F 40/35*   (2020.01)
(Continued)

(52) U.S. Cl.
CPC ............ *G06F 40/35* (2020.01); *G06F 40/242* (2020.01); *G06F 40/289* (2020.01); *G06F 40/56* (2020.01)

(58) Field of Classification Search
None
See application file for complete search history.

(56) References Cited

U.S. PATENT DOCUMENTS

| 2003/0182102 A1* | 9/2003 | Corston-Oliver ....... G06F 40/56 704/9 |
| 2018/0329879 A1* | 11/2018 | Galitsky ................. G06F 40/51 |
| 2021/0201238 A1* | 7/2021 | Sekar ..................... G10L 15/16 |

FOREIGN PATENT DOCUMENTS

| JP | 2003-303187 A | 10/2003 |
| JP | 2003-308320 A | 10/2003 |

OTHER PUBLICATIONS

Japanese Office Action for Japanese Application No. 2020-158812, dated Jun. 7, 2022, 5 pages.

\* cited by examiner

*Primary Examiner* — Jakieda R Jackson
(74) *Attorney, Agent, or Firm* — Seed IP Law Group LLP (57) ABSTRACT

Embodiments of the present disclosure relate to a dialogue interaction method and apparatus, a device and a storage medium, and relate to the field of artificial intelligence technology. The method may include: determining a first semantic encoding of received user information according to a sentence tree; determining a second semantic encoding for responding to the user information from a dialogue tree according to the first semantic encoding, the sentence tree and the dialogue tree being trained and obtained through sentence node information and/or word node information in a logical brain map sample; and determining a target response sentence of the second semantic encoding from the sentence tree, to be used for a dialogue with a user.

15 Claims, 5 Drawing Sheets

(51) Int. Cl.
*G06F 40/56* (2020.01)
*G06F 40/289* (2020.01)
*G06F 40/242* (2020.01)

DIALOGUE INTERACTION METHOD AND APPARATUS, DEVICE, AND STORAGE MEDIUM

CROSS-REFERENCE TO RELATED APPLICATIONS

This application claims priority to Chinese Application No. 202010017420.6, filed on Jan. 8, 2020 and entitled "Dialogue Interaction Method and Apparatus, Device, and Storage Medium," the entire disclosure of which is hereby incorporated by reference.

TECHNICAL FIELD

Embodiments of the present disclosure relate to the field of computer technology, particularly to the field of artificial intelligence technology, and specifically to a dialogue interaction method and apparatus, a device and a storage medium.

BACKGROUND

With the popularization of smart devices such as a smart sound box device, demands for dialogues between users and the smart devices are increasing day by day. In addition to needs for resource on-demand, home control, etc., most users have needs for human-machine interaction behaviors with the smart devices, for example, an emotional communication, a daily dialogue, and a topic chat. However, the existing technology generally can only achieve the effects of a single-round dialogue, and is lack of the logicality of the context of the dialogue, resulting in a low accuracy of a multi-round dialogue and a high cost of training corpus.

SUMMARY

Embodiments of the present disclosure provide a dialogue interaction method and apparatus, a device and a storage medium, to improve the accuracy of a multi-round dialogue between a user and a machine.

In a first aspect, an embodiment of the present disclosure provides a dialogue interaction method, the method includes: determining a first semantic encoding of received user information according to a sentence tree; determining a second semantic encoding for responding to the user information from a dialogue tree according to the first semantic encoding, the sentence tree and the dialogue tree being trained and obtained through sentence node information and/or word node information in a logical brain map sample; and determining a target response sentence of the second semantic encoding from the sentence tree, to be used for a dialogue with a user.

An embodiment of the present disclosure has the following advantages or beneficial effects: a dialogue logic is quickly learned into a sentence tree and a dialogue tree based on a logical brain map, and response content takes into account the dialogue content of a preceding part of a dialogue through alternating matching between the sentence tree and the dialogue tree, and contains various representations of the dialogue content, and thus, the diversity of the dialogue content is ensured, and the accuracy of a multi-round dialogue between a user and a machine is improved.

Alternatively, the sentence tree is used to represent a combination relationship between a word and a sentence, and the dialogue tree is used to represent a response relationship between sentences in the dialogue.

An embodiment of the present disclosure has the following advantages or beneficial effects: through a sentence tree having a combination relationship and a dialogue tree having a response relationship, response content takes into account the dialogue content of a preceding part of a dialogue, and contains various representations of the dialogue content, and thus, various possibilities of the dialogue content are ensured.

Alternatively, the sentence tree and the dialogue tree are determined by: learning and obtaining anode in the sentence tree and a node in the dialogue tree according to the logical brain map sample; and determining, in the sentence tree and the dialogue tree, a conversion probability between nodes.

An embodiment of the present disclosure has the following advantages or beneficial effects: node information and a conversion probability between nodes that are determined according to a logical brain map sample together constitute a sentence tree and a dialogue tree, such that the nodes in the trees have a dialogue logic, and various representations of dialogue content are contained, and thus, various possibilities of the dialogue content are ensured.

Alternatively, learning and obtaining the node in the sentence tree according to the logical brain map sample includes: performing a word node depth search on the logical brain map sample to obtain a complete dialogue path; constituting a dialogue dictionary according to word nodes in the complete dialogue path; performing sentence semantic compression on a sentence composed of words in the dialogue dictionary to generate a sentence node in the sentence tree, and obtaining a combination of word nodes in the sentence node according to the dialogue dictionary; and adding a semantic encoding identifying sentence semantics to the sentence node according to semantics of the combination of the word nodes in the sentence node.

An embodiment of the present disclosure has the following advantages or beneficial effects: a word in a dialogue dictionary constructed based on a logical brain map sample constitutes a word node in a sentence tree, semantics expressed by a combination of word nodes constitutes a sentence node, and based on different approaches to combine the word nodes, the sentence node may contain different sentence semantics, and thus, each kind of sentence semantics is configured with a corresponding semantic encoding, which is conductive to identifying user information of different representations and conductive to a plurality of representations of the same semantics, thereby ensuring the diversity of dialogues.

Alternatively, learning and obtaining the node in the dialogue tree according to the logical brain map sample includes: performing semantic compression on sentence nodes in the logical brain map sample to generate a sentence node in the dialogue tree; determining a response relationship between sentence nodes in the dialogue tree based on a dialogue logic represented by a connection relationship between sentence nodes in the logical brain map; and obtaining the dialogue tree according to the sentence nodes and the response relationship between the sentence nodes, and adding a semantic encoding identifying sentence semantics to the sentence nodes according to semantics of the sentence nodes.

An embodiment of the present disclosure has the following advantages or beneficial effects: sentence semantics compressed based on a logical brain map sample constitutes a sentence node in a dialogue tree, a semantic encoding is added to each sentence node, a response relationship between sentence nodes in the dialogue tree is determined based on the dialogue logic in a logical brain map, and the corresponding relationship of the semantics is conductive to determining the dialogue logic between utterances in a dialogue, and is not limited to the representation of a word in a sentence.

Alternatively, the determining a first semantic encoding of received user information according to a sentence tree includes: traversing from a word node to a sentence node in the sentence tree according to word information of the user information, and determining a combination of target word nodes constituting the user information; and determining, from a sentence node to which the combination of the target word nodes belongs, the first semantic encoding for representing the user information, according to the combination of the target word nodes.

An embodiment of the present disclosure has the following advantages or beneficial effects: by matching word information in user information and a sentence node in a sentence tree, a combination of target word nodes conforming to the word information is determined, such that first semantic encoding of the sentence node to which the combination of the target word nodes belongs is determined, thereby implementing the semantic identification for the user information.

Alternatively, the determining a second semantic encoding for responding to the user information from a dialogue tree according to the first semantic encoding includes: positioning and obtaining, from the dialogue tree, a target user sentence node consistent with the first semantic encoding; extracting and obtaining, according to a conversion probability of a candidate sentence node having a response relationship with the target user sentence node, a response sentence node from the candidate sentence node; and determining the second semantic encoding of the response sentence node.

An embodiment of the present disclosure has the following advantages or beneficial effects: based on first semantic encoding, a sentence node is positioned in a dialogue tree, such that second semantic encoding responding to the user information is determined according to a response relationship between sentence nodes, and thus, it is implemented that the response semantics is determined on the basis of a dialogue logic, and the limitation of a word representation on a dialogue and the neglect of a preceding part of the dialogue are avoided, thereby ensuring the diversity and accuracy of dialogues.

Alternatively, the determining a target response sentence of the second semantic encoding from the sentence tree includes: finding a target response sentence node consistent with the second semantic encoding from the sentence tree; extracting, according to conversion probabilities of candidate word nodes having a combination relationship with the target response sentence node, target response word nodes from the candidate word nodes; and combining the target response word nodes to obtain the target response sentence.

An embodiment of the present disclosure has the following advantages or beneficial effects: a target response sentence node is determined from a sentence tree according to second semantic encoding as response semantics, a combination of words expressing the second semantics is determined according to the second semantic encoding, and finally, a target response sentence is formed to be used for a dialogue, and thus, in the situation where the semantics is correctly expressed, the diversity of dialogues is ensured.

In a second aspect, an embodiment of the present disclosure provides a dialogue interaction apparatus, the apparatus includes: a user semantics identifying module, configured to determine a first semantic encoding of received user information according to a sentence tree; a response semantics determining module, configured to determine a second semantic encoding for responding to the user information from a dialogue tree according to the first semantic encoding, the sentence tree and the dialogue tree being trained and obtained through sentence node information and/or word node information in a logical brain map sample; and a response sentence determining module, configured to determine a target response sentence of the second semantic encoding from the sentence tree, to be used for a dialogue with a user.

In a third aspect, an embodiment of the present disclosure provides an electronic device, the electronic device includes: at least one processor; and a storage device, communicatively connected with the at least one processor, where the storage device stores an instruction executable by the at least one processor, and the instruction is executed by the at least one processor, to cause the at least one processor to perform the dialogue interaction method according to embodiments of the present disclosure.

In a fourth aspect, an embodiment of the present disclosure provides a non-transitory computer readable storage medium, storing a computer instruction, where the computer instruction is used to cause a computer to perform the dialogue interaction method according to embodiments of the present disclosure.

An embodiment of the present disclosure has the following advantages or beneficial effects: a sentence tree and a dialogue tree are pre-trained, learned and obtained through sentence node information and/or word node information in a logical brain map sample, when user information of a user dialogue is received, first semantic encoding of the user information is determined according to the sentence tree, second semantic encoding for responding to the user information is determined from the dialogue tree according to the first semantic encoding, and finally, a target response sentence is determined from the sentence tree according to the second semantic encoding, to be used for a dialogue with a user. In embodiments of the present disclosure, the dialogue logic is quickly learned into the sentence tree and the dialogue tree based on the logical brain map, and the response content takes into account the dialogue content of a preceding part of the dialogue through alternating matching between the sentence tree and the dialogue tree, and contains various representations of the dialogue content, and thus, the diversity of the dialogue content is ensured, and the accuracy of a multi-round dialogue between a user and a machine is improved.

Other effects of the above alternative implementations will be described hereinafter in combination with specific embodiments.

BRIEF DESCRIPTION OF THE DRAWINGS

Accompanying drawings are used for a better understanding of the scheme, and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

First Embodiment

Figure 1:
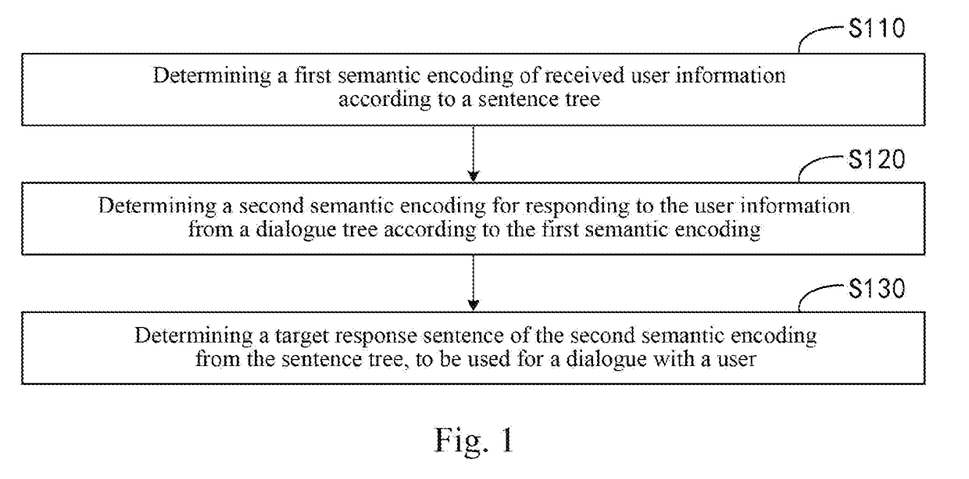
FIG. 1 is a flowchart of a dialogue interaction method according to a first embodiment of the present disclosure.

FIG. 1 is a flowchart of a dialogue interaction method according to the first embodiment of the present disclosure. This embodiment may be applicable to a situation where a response sentence is determined in a multi-round dialogue between a user and a machine. The method may be performed by a dialogue interaction apparatus, and the apparatus is implemented by means of software and/or hardware, and alternatively configured in an electronic device, for example, a smart sound box. As shown in FIG. 1, the method specifically includes the following steps.

S110, determining a first semantic encoding of received user information according to a sentence tree.

In a specific embodiment of the present disclosure, the user information refers to dialogue voice inputted by a user to an electronic device. The dialogue voice may refer to initial voice in a dialogue initiated actively by the user to the electronic device after the user wakes up the electronic device, any dialogue voice inputted by the user during a dialogue, or dialogue voice inputted by the user when the electronic device actively initiates a dialogue. The user information may not be limited to the same dialogue scenario, but may be switched between different dialogue scenarios. The electronic device may cooperate with the user to implement the dialogue.

In this embodiment, the first semantic encoding refers to an encoding expressing semantics of the user information. In view of that a word or a sentence has at least one kind of semantics, in this embodiment, one kind of semantics is uniquely identified by using a semantic encoding, so as to present a dialogue logic through fundamental semantics, which avoids that the dialogue is limited to the word representation in an external form.

In this embodiment, a data structure for a dialogue interaction in the electronic device may include at least a sentence tree and a dialogue tree. Here, the sentence tree is used to represent a combination relationship between a word and a sentence, and the dialogue tree is used to represent a response relationship between sentences in a dialogue. Both the sentence tree and the dialogue tree are trained and obtained through sentence node information and/or word node information in a logical brain map sample.

Specifically, a logical brain map refers to that the words and/or sentences involved in a dialogue are presented through a subordinate relationship and a hierarchical relationship between related nodes. The logical brain map may include the combination relationship between the word and the sentence, and the dialogue tree is used to represent the response relationship between the sentences in the dialogue. In this embodiment, logical brain maps may be pre-constructed for different scenarios to be used to represent dialogue logics in the different scenarios. The logical brain maps in the different scenarios are used as a large number of basic samples, and a large number of sentences and word representations of the sentences are mined. The words in the logical brain map samples are reserved, but semantic compression is performed on the sentences in the logical brain map samples. A semantic encoding is added to a sentence node and a word node based on semantics, that is, each kind of semantics is configured with a uniquely corresponding semantic encoding. Correspondingly, a node containing many kinds of semantics is configured with a plurality of semantic encodings, to be used for uniquely identifying one kind of semantics. Finally, a conversion probability between nodes is determined, and the sentence tree and the dialogue tree are formed to be stored in the electronic device for use by the electronic device in the dialogue with the user. Here, the process of training the sentence tree and the dialogue tree will be explained in a subsequent embodiment.

In this embodiment, after the user information is received, the user information in an external form is converted into fundamental semantics based on a combination relationship between a word and sentence semantics in the sentence tree. Accordingly, it is first implemented that the received user information is not limited to the external representation form. Specifically, the semantics expressed by the external form of the user information may be determined according to the combination relationship between the word and the sentence in the sentence tree, such that the semantic understanding for the user information is realized, thus obtaining the first semantic encoding expressing the semantics of the user information.

For example, the electronic device may be a smart device having a dialogue function such as a smart sound box and a service robot. After receiving the user information in the form of voice inputted by the user through an apparatus such as a sensor, the electronic device may convert the user information in the form of voice into a form of text, and perform word splitting on the user information in the form of text. According to the arrangement order of the words in the user information, a combination of target word nodes constituting the user information is determined by traversing from a word node to a sentence node in the sentence tree, based on a connection relationship between word nodes in the sentence tree. Therefore, the first semantic encoding for representing the user information is determined from a sentence node to which the combination of the target word nodes belongs.

S120, determining a second semantic encoding for responding to the user information from a dialogue tree according to the first semantic encoding.

In a specific embodiment of the present disclosure, the first semantic encoding refers to the encoding expressing the semantics of the user information, and correspondingly, the second semantic encoding refers to a semantic encoding for responding to the user information. Here, the definitions of "first" and "second" have no specific meaning, but only distinguish the semantics of the user information from the semantics corresponding to the response of the user information.

In this embodiment, after the semantics of the user information is determined, the semantics of response information is determined from the semantics of the user information based on the response relationship between the sentences in the dialogue in the dialogue tree. Thus, it is further implemented that the response is not limited to the external representation form and the semantics is used as the basis for matching. Specifically, a target user sentence node consistent with the first semantic encoding may be positioned and obtained from the dialogue tree, that is, the degree of dialogue reached by the current user information may be positioned. A response sentence node for continuing from or responding to the target user sentence node is determined according to the response relationship between the sentences in the dialogue tree, to obtain the second semantic encoding expressing the semantics of the response sentence node.

Here, since the second semantic encoding is determined based on the overall dialogue logic of the dialogue tree, the determination for the second semantic encoding takes into account a preceding part of the dialogue, rather than simply replies to the user information in this interaction, such that the entire dialogue is linked, thus implementing the accurate determination for the semantics of the response.

For example, the dialogue tree contains complete content of dialogues and a logical relationship. It is assumed that a certain dialogue is composed of 7 layers of dialogue semantics, the 7 layers of dialogue semantics having a response relationship therebetween. It is assumed that the degree of dialogue reached by the current user information and positioned from the dialogue tree according to the first semantic encoding reaches the dialogue semantics of the third layer. Thus, according to the response relationship between sentence nodes in the dialogue tree, the semantic encoding of the dialogue semantics of the fourth layer in the dialogue is determined as the second semantic encoding.

Here, there may be a plurality of kinds of candidate dialogue semantics for responding to the user information in the dialogue tree. That is, the target user sentence node may include a plurality of child nodes when the target user sentence node is a parent node. In addition, based on statistics on the logical brain map sample, the conversion probabilities that the parent node is converted to the child nodes are different. Thus, the candidate semantics with a highest conversion probability may be selected as the second semantic encoding. In order to ensure the diversity of dialogues and avoid that the dialogues are limited to one kind of situation, in this embodiment, a random extraction may be performed according to the conversion probabilities of the candidate dialogue semantics, to obtain the second semantic encoding.

S130, determining a target response sentence of the second semantic encoding from the sentence tree, to be used for a dialogue with a user.

In a specific embodiment of the present disclosure, the target response sentence refers to a sentence that can express the semantics of the second semantic encoding and has a specific external word representation form. The target response sentence may be present in a form of text. The target response sentence is played to the user by the electronic device to respond to the user information of the user, thus implementing the dialogue with the user.

In this embodiment, in view of that the same semantics may have a plurality of external word representation forms, after the second semantic encoding is determined, the fundamental semantics may be converted into the target response sentence in the external form based on the combination relationship between the word and sentence semantics in the sentence tree. Thus, it is implemented that the output of the target response sentence is not limited to the same external word representation form. Specifically, a target response sentence node consistent with the second semantic encoding is found from the sentence tree. Target response word nodes for composing the target response sentence are determined according to word nodes having a combination relationship with the target response sentence node. Finally, the target response word nodes are combined to obtain the target response sentence.

Here, the sentence tree may include a plurality of synonyms. That is, the target response sentence node or a certain target response word node may include a plurality of child nodes, when the target response sentence node or the target response word node is a parent node. In addition, based on the statistics on the logical brain map sample, the conversion probabilities that the parent node is converted to the child nodes are different. Thus, the candidate word node with a highest conversion probability may be selected as the target response word node required for the connection of the sentence. In order to ensure the diversity of the dialogues and avoid that the dialogues are limited to one kind of representation, in this embodiment, a random extraction may be performed according to the conversion probabilities of candidate word nodes, to obtain a target response word node of each level.

According to the technical solution of this embodiment, the sentence tree and the dialogue tree are pre-trained, learned and obtained through the sentence node information and/or the word node information in the logical brain map sample. When the user information of the user dialogue is received, the first semantic encoding of the user information is determined according to the sentence tree. The second semantic encoding for responding to the user information is determined from the dialogue tree according to the first semantic encoding. Finally, the target response sentence is determined from the sentence tree according to the second semantic encoding, to be used for the dialogue with the user. In this embodiment of the present disclosure, the dialogue logic is quickly learned into the sentence tree and the dialogue tree based on the logical brain map, and the response content takes into account the dialogue content of the preceding part of the dialogue through alternating matching between the sentence tree and the dialogue tree, and contains various representations of the dialogue content, and thus, the diversity of the dialogue content is ensured, and the accuracy of the multi-round dialogue between the user and the machine is improved.

Second Embodiment

Figure 2:
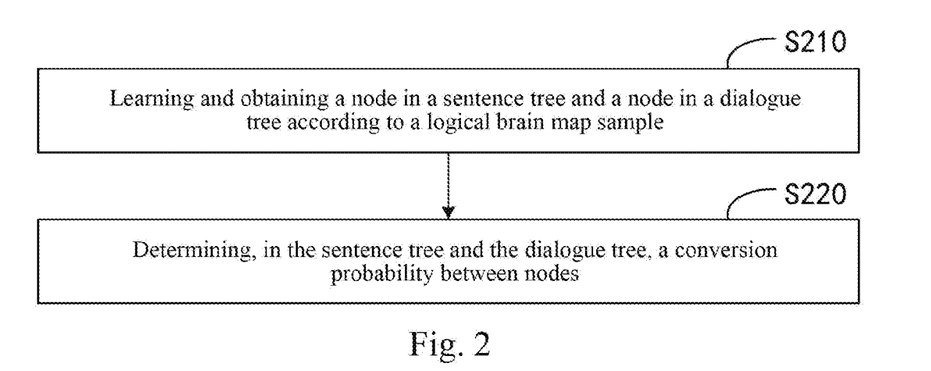
FIG. 2 is a flowchart of training a sentence tree and a dialogue tree according to a second embodiment of the present disclosure.

FIG. 2 is a flowchart of training a sentence tree and a dialogue tree according to a second embodiment of the present disclosure. On the basis of the first embodiment described above, the approach to training the sentence tree and the dialogue tree is further explained in this embodiment, and the sentence tree and the dialogue tree can be trained and obtained based on the sentence node information and/or the word node information in the logical brain map sample. As shown in FIG. 2, the method specifically includes the following steps.

S210, learning and obtaining a node in a sentence tree and a node in a dialogue tree according to a logical brain map sample.

In a specific embodiment of the present disclosure, a logical brain map refers to that the words and/or sentences involved in a dialogue are presented through a subordinate relationship and a hierarchical relationship between related nodes. Logical brain maps may be pre-constructed for different scenarios to be used to represent dialogue logics in the different scenarios. The logical brain maps in the different scenarios are used as a large number of samples.

This embodiment is not limited to the external word representation form and semantics present in the logical brain map sample. A complete dialogue path is obtained by performing a depth-first-search (DFS) on nodes in the logical brain map sample. In view of that a part of the complete dialogue path may also constitute a dialogue, the complete dialogue path is split, to mine a large number of word representations of the sentence and the semantics expressed by the sentence.

In this embodiment, the words in the logical brain map sample are reserved, but semantic compression is performed on the sentences in the logical brain map sample. A semantic encoding is added to a sentence node and a word node based on semantics, that is, each kind of semantics is configured with a uniquely corresponding semantic encoding. Correspondingly, a node containing many kinds of semantics is configured with a plurality of semantic encodings. Each semantic encoding is used for uniquely identifying one kind of semantics. The node in the sentence tree and the node in the dialogue tree are formed.

Figure 3:
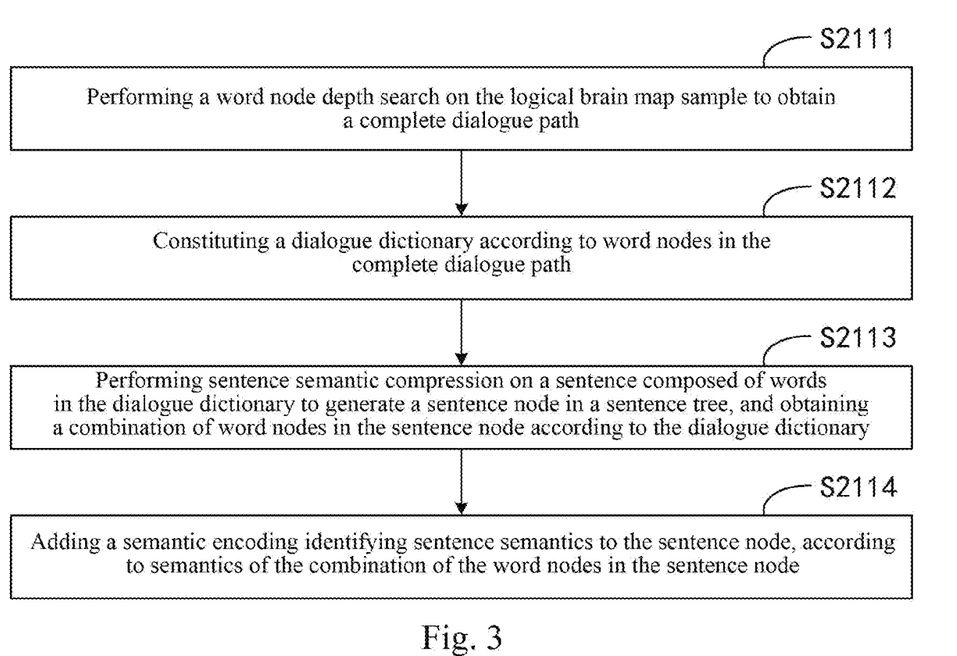
FIG. 3 is a flowchart of training a node in the sentence tree according to the second embodiment of the present disclosure.

Specifically, FIG. 3 is a flowchart of training the node in the sentence tree. As shown in FIG. 3, learning and obtaining the node in the sentence tree according to the logical brain map sample includes the following steps.

S2111, performing a word node depth search on the logical brain map sample to obtain a complete dialogue path.

In this embodiment, the depth search starts from a parent node in the logical brain map sample, and continues as deep as possible along each branch until the search cannot be further performed, and thus, the complete dialogue path is obtained. Here, for the sentence nodes in a traversed path, the dialogue logic between the sentence nodes may be learned and obtained. For the word nodes in the traversed path, a complete representation of a sentence may be obtained.

S2112, constituting a dialogue dictionary according to word nodes in the complete dialogue path.

In this embodiment, since a part of a complete sentence path may also constitute a dialogue, and a part of a complete word path may also be combined into a sentence, the splitting is performed on the complete dialogue path, to mine the large number of word representations of the sentence and the semantics expressed by the sentence. Here, in the process of training the sentence tree, all the word nodes in the logical brain map sample, all the word nodes during the mining, and the connection relationships between the word nodes are reserved, to constitute the dialogue dictionary.

S2113, performing sentence semantic compression on a sentence composed of words in the dialogue dictionary to generate a sentence node in the sentence tree, and obtaining a combination of word nodes in the sentence node according to the dialogue dictionary.

In this embodiment, the words in the dialogue dictionary are combined according to the word nodes in the dialogue dictionary and the connection relationship thereof, to obtain the semantics of the sentence composed of the words. Semantic compression is performed on the semantics of the sentence composed of the words, based on the minimization of data storage in an electronic device and the completeness and uniqueness of the sentence tree. That is, the sentences having the same semantics are merged to generate the sentence node in the sentence tree. However, all the words in the sentences are reserved, i.e. the combination of the word nodes in the sentence node is obtained. It may be understood that the sentence tree reserves a plurality of word representation forms of the sentence.

For example, if sentence semantics is expressed as that Lao Zhang criticizes Xiao Wang, the following three representation forms may be included: "Lao Zhang criticizes Xiao Wang," "Lao Zhang makes a criticism against Xiao Wang," and "Xiao Wang is criticized by Lao Zhang." Then, the three representation forms may be compressed into the same sentence node based on the same semantics, and the sentence node includes three combinations of word nodes.

S2114, adding a semantic encoding identifying sentence semantics to the sentence node, according to semantics of the combination of the word nodes in the sentence node.

In this embodiment, one kind of semantics is uniquely identified by using a semantic encoding, so as to present a dialogue logic through fundamental semantics, which avoids that the dialogue is limited to the word representation in an external form. Here, since, in the sentence node, additional semantics may be expressed based on a sentence composed of different word nodes on the same path, additional sentence semantics are correspondingly given to the sentence node. Therefore, one semantic encoding is added to each kind of semantics according to the semantics of the combination of the word nodes in the sentence node. Correspondingly, the same sentence node in the sentence tree may have a plurality of semantic encodings.

Here, a word node in the sentence tree may also have a semantic encoding. Correspondingly, the semantic encoding of the sentence node is generated according to the semantic encodings of the word nodes included in the combination of the word nodes. That is, the sentence node and the combination of the word nodes present a certain association relationship in semantic encoding. For example, the semantic encoding of the sentence node may be a connection of the semantic encodings of the word nodes in the combination of the word nodes, or may be an encoding generated through a certain algorithm using the semantic encodings of the word nodes.

Figure 4:
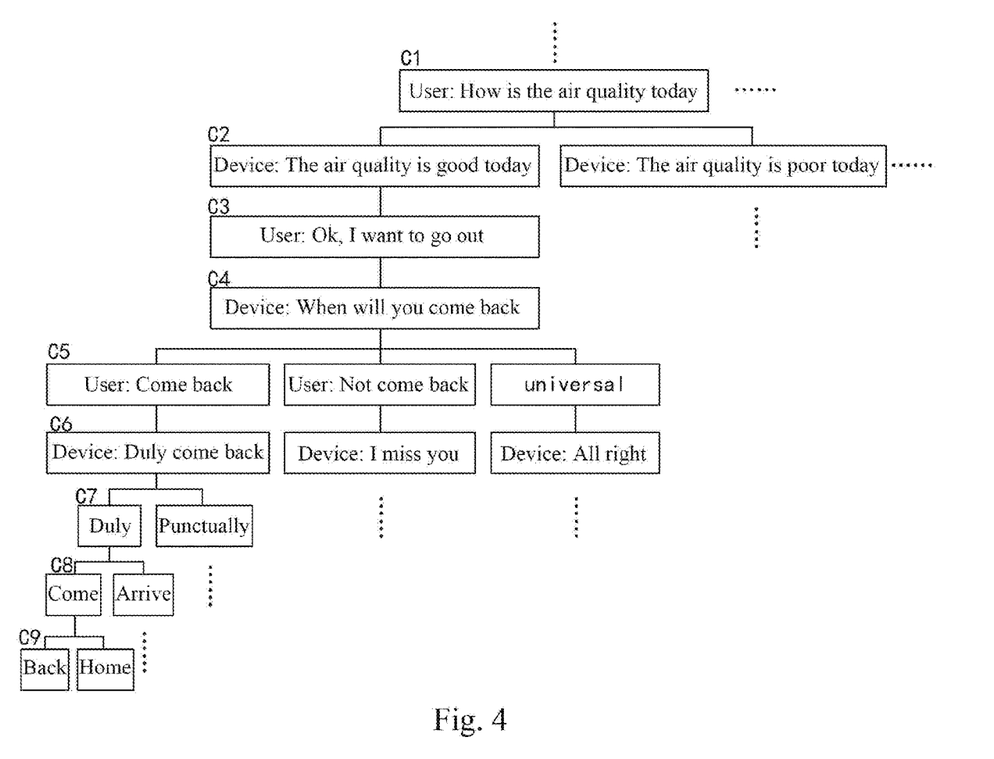
FIG. 4 is an example diagram of a logical brain map sample according to the second embodiment of the present disclosure.

For example, FIG. 4 is an example diagram of the logical brain map sample. As shown in FIG. 4, it is assumed that the sample includes 9 layers of nodes C1-C9, the layers C1-C6 may be sentence nodes, and the layers C7-C9 may be word nodes. The complete path [C1, C2, ..., C9] may be obtained by performing a depth-first-search on the sample, to obtain a dialogue. Splitting is performed on the complete path. Taking the left-most branch as an example, [C1, C2, C3] may also constitute a dialogue to mine a large number of word representations of the sentence and the semantics expressed by the sentence. The layers C7-C9 constitute words in a dialogue. Here, by performing sentence semantics compression on the sample, a plurality of nodes in the layer C7 may be merged into the sentence node C6 having the same semantics, to generate the sentence node in the sentence tree. For the sentence node C6, a plurality of combinations of word nodes in [C7, C8, C9] may be obtained. According to the semantics of a combination of a part of word nodes in the sentence node, it is assumed that "duly come" and "duly arrive" may form the semantics different from that of the complete path of C7-C9, and thus, at least two semantic encodings may be added to the sentence node C6.

It should be noted that, based on the complexity of the logical brain map, FIG. 4 is only a simple illustration for the logical brain map, and may be not completely accurate, and the logical brain map is not limited to the specific representation of the example.

Figure 5:
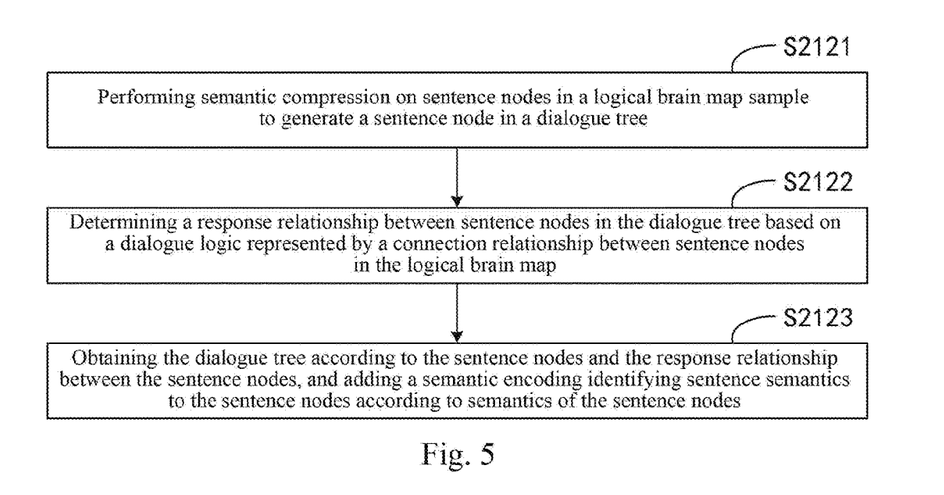
FIG. 5 is a flowchart of training a node in the dialogue tree according to the second embodiment of the present disclosure.

Specifically, FIG. 5 is a flowchart of training the node in the dialogue tree. As shown in FIG. 5, learning and obtaining the node in the dialogue tree according to the logical brain map sample includes the following steps.

S2121, performing semantic compression on sentence nodes in the logical brain map sample to generate a sentence node in the dialogue tree.

In this embodiment, in the process of generating the dialogue tree, the sentence nodes in the logical brain map sample are basically reserved, and the semantic compression is only performed on the sentence nodes in the logical brain map, i.e., sentences having the same semantics are merged, to generate the sentence node in the dialogue tree. For example, the sentences in the three sentence nodes present in the logical brain map sample are "Lao Zhang criticizes Xiao Wang," "Lao Zhang makes a criticism against Xiao Wang," and "Xiao Wang is criticized by Lao Zhang." Since the sentence semantics of the three sentence nodes are the same, the sentence semantics of the three sentence nodes is generated to form the same sentence node in the dialogue tree.

S2122, determining a response relationship between sentence nodes in the dialogue tree based on a dialogue logic represented by a connection relationship between sentence nodes in the logical brain map.

In this embodiment, in compliance with the connection relationship between the sentence nodes in the logical brain map, the response relationship is established for the sentence nodes in the dialogue tree. Correspondingly, since the dialogue tree is trained and obtained based on a large number of logical brain map samples, the dialogue tree may include a plurality of candidate sentence nodes having a response relationship with the same sentence node.

S2123, obtaining the dialogue tree according to the sentence nodes and the response relationship between the sentence nodes, and adding a semantic encoding identifying sentence semantics to the sentence nodes according to semantics of the sentence nodes.

In this embodiment, the sentence nodes and the response relationship therebetween together constitute the dialogue tree. A sentence node in the dialogue tree generally has only one kind of semantics, and correspondingly, each sentence node in the dialogue tree has a uniquely corresponding semantic encoding. Here, the semantic encoding of the sentence node in the dialogue tree corresponds to the semantic encoding of the sentence node in the sentence tree, that is, there is a corresponding relationship, and the sentence node in the dialogue tree and the sentence node in the sentence tree have the same semantic encoding, so as to position the degree of dialogue of the user information from the sentence tree to the dialogue tree, and find a response sentence from the dialogue tree to the sentence tree.

S220, determining, in the sentence tree and the dialogue tree, a conversion probability between nodes.

In a specific embodiment of the present disclosure, the conversion probability refers to the probability that a previous node is converted and connected to a next node between nodes having a connection relationship. In this embodiment, each node may be configured with a list of conversion probabilities for representing conversion probabilities that different nodes are connected to this node.

In the sentence tree, based on the logical brain map sample, the probability of using a first word expressing sentence node semantics may be statisticized, and the probability of using a word node to connect another word node may be statisticized. For example, for the sentence node semantics "I duly come home," "I" may be followed by "duly" and "punctually." Here, the probability of using "duly" is 60%, and the probability of using "punctually" is 40%. Therefore, on the basis of the semantics "I duly come home," the probability that the word node "I" is converted to the word node "duly" is 60%, and the probability that the word node "I" is converted to the word node "punctually" is 40%.

In the dialogue tree, the probabilities of using different sentence nodes responding to the same semantics may be statisticized based on the logical brain map sample. For example, for the sentence node semantics "I miss you," the probability of "I miss you, too" responding to the sentence node semantics is 70%, and the probability of "memeda" responding to the sentence node semantics is 30%.

Here, for user information of a question type in the dialogue, the electronic device may determine a reply answer through a network search and directly use the reply answer as a response to implement the dialogue, or may determine the semantics of the reply answer through the traversal for the word nodes in the sentence tree and re-determine, in the sentence tree, a combination of word nodes of the reply answer.

According to the technical solution of this embodiment, the node in the sentence tree and the node in the dialogue tree are pre-trained, learned and obtained through the sentence node information and/or the word node information in the logical brain map sample. The conversion probability between the nodes is statisticized according to the logical brain sample to form the sentence tree and the dialogue tree. In this embodiment of the present disclosure, the dialogue logic is quickly learned into the sentence tree and the dialogue tree based on the logical brain map, and various representations of the dialogue content are contained, and thus, the diversity of the dialogue content is ensured, and the accuracy of the multi-round dialogue between the user and the machine is improved.

Third Embodiment

Figure 6:
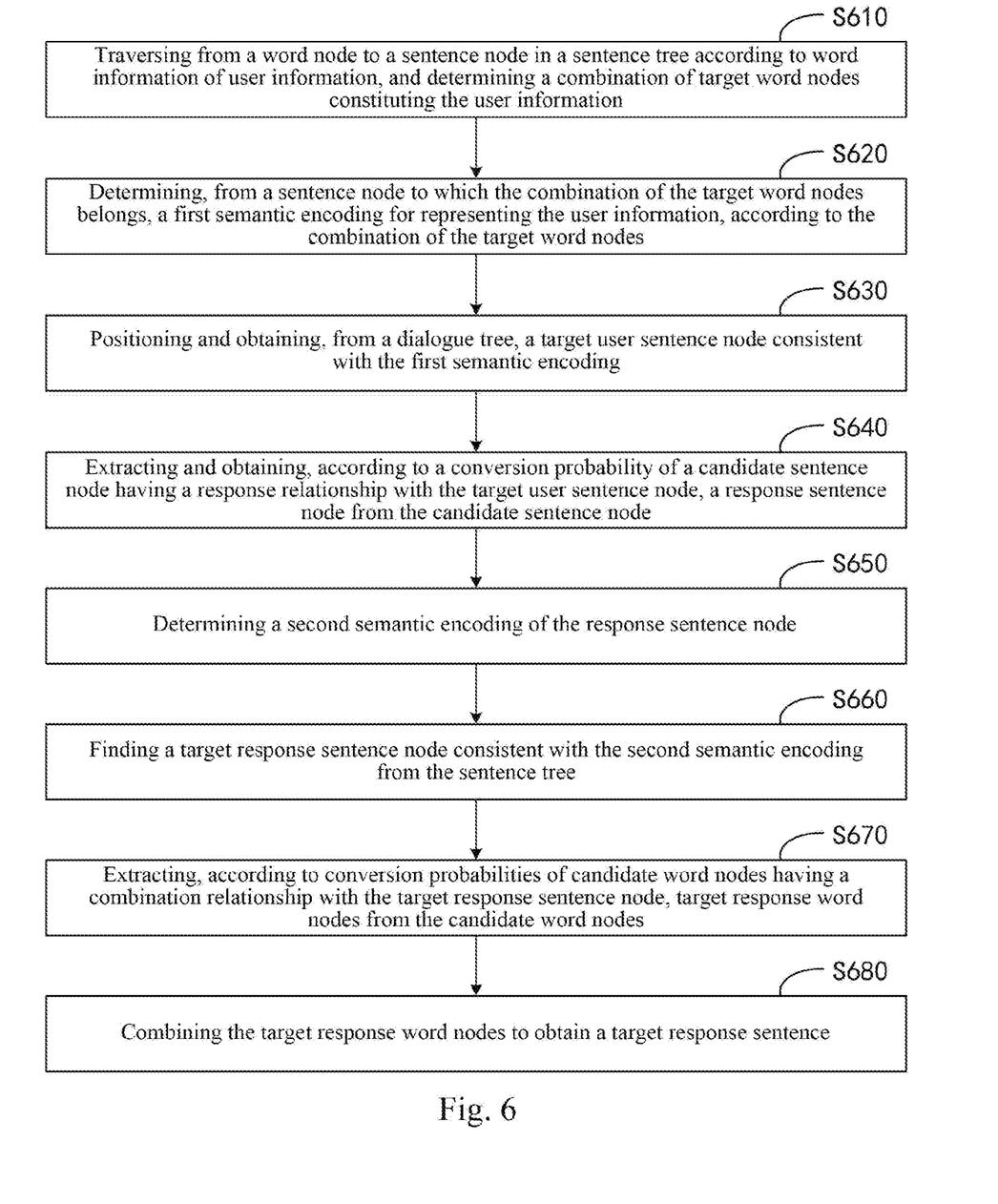
FIG. 6 is a flowchart of a dialogue interaction method according to a third embodiment of the present disclosure.

FIG. 6 is a flowchart of a dialogue interaction method according to a third embodiment of the present disclosure. On the basis of the first embodiment described above, in this embodiment, the approach to determining the target response sentence is further explained, the semantics of the user information can be identified through the traversal for the word nodes in the sentence tree, the response semantics is determined through the response relationship between the sentence nodes in the dialogue tree, and finally, the target response sentence is determined through the extraction for word nodes in the sentence tree under the response semantics. As shown in FIG. 6, the method specifically includes the following steps.

S610, traversing from a word node to a sentence node in a sentence tree according to word information of user information, and determining a combination of target word nodes constituting the user information.

In a specific embodiment of the present disclosure, the user information refers to dialogue voice inputted by a user to an electronic device. Correspondingly, the word information of the user information may be information such as words obtained by performing splitting on the user information in a form of text that is converted from the user information in a form of voice, and an order of the words.

In this embodiment, the combination of the target word nodes refers to word nodes in the sentence tree that match the external form of the word information of the user information, have a connection relationship between the word nodes and is capable of constituting a path. The fundamental semantics of the user information may be obtained through the matching in the form.

Specifically, according to the reverse order of the words in the word information, the words in the word information may be adopted in sequence. On the basis of a word node successfully matching a preceding word, a traversal is performed in an order from a child node to a root node according to the connection relationship between the word nodes in the sentence tree. Here, the combination of all the word nodes that are successfully matched and traversed and constitute the path is the combination of the target word nodes constituting the user information.

For example, it is assumed that the nodes C6-C9 in FIG. 4 refer to a sentence tree, and it is assumed that the user information is "duly come home," the word information of the user information is obtained as follows: "duly" → "come" → "home." Then, a traversal is performed in an order from a child node to a root node. First, matching is performed on the word information "home" and the word node C9. Second, matching is performed on the word information "come" and "come" in the word node C8 if the matching between the word information "home" and the word node C9 is successful. Finally, matching is performed on the word information "duly" and "duly" in the word node C7 if the matching between the word information "come" and "come" in the word node C8 is successful. If the matching between word information "duly" and "duly" in the word node C7 is successful and a path is constituted, "duly" in the word node C7, "come" in the word node C8 and "home" in the word node C9 are used as the combination of the target word nodes.

S620, determining, from a sentence node to which the combination of the target word nodes belongs, a first semantic encoding for representing the user information, according to the combination of the target word nodes.

In a specific embodiment of the present disclosure, since the word nodes in the combination of the target word nodes constitute the path, the combination of the target word nodes belongs to the same sentence node, and therefore, the semantic encoding of the sentence node is used as the first semantic encoding of the user information. Here, if the sentence node includes a plurality of semantic encodings, according to the word nodes included in the combination of the target word nodes, the semantic encoding of the semantics expressed by the combination of the target word nodes is determined from the plurality of semantic encodings based on the generation basis of the semantic encodings of the sentence node, to be used as the first semantic encoding of the user information. For example, in the above example, the semantic encoding of the sentence node C6 is used as the first semantic encoding of the user information.

S630, positioning and obtaining, from a dialogue tree, a target user sentence node consistent with the first semantic encoding.

In a specific embodiment of the present disclosure, the target user sentence node refers to a sentence node, in the dialogue tree, matching the semantics of the user information. In view of that the dialogue tree represents the response relationship between sentences in a dialogue, the target user sentence node positions the current degree of dialogue of the user information.

Specifically, matching is performed on the first semantic encoding and the semantic encoding of each sentence node in the dialogue tree, to obtain a sentence node matching the first semantic encoding as the target user sentence node. Here, if the user information is dialogue information during the dialogue, according to a connection relationship between sentence nodes in the dialogue tree, the matching for the target user sentence node may be continued among child nodes to which the sentence node matching the preceding part of the dialogue is connected, so as to narrow the matching range. If the matching fails, it may indicate that the user initiates a dialogue of other topics, and thus, the matching may be performed in all dialogue trees at this time.

S640, extracting and obtaining, according to a conversion probability of a candidate sentence node having a response relationship with the target user sentence node, a response sentence node from the candidate sentence node.

In a specific embodiment of the present disclosure, the response sentence node refers to a sentence node, in the dialogue tree, used for responding to the target user sentence node. There may be a plurality of candidate sentence nodes for responding to the target user sentence node in the dialogue tree. That is, the target user sentence node may include a plurality of child nodes, when the target user sentence node is a parent node. The response sentence node is one of the candidate sentence nodes having the response relationship with the target user sentence node.

Here, based on statistics on a logical brain map sample, the conversion probabilities that the parent node is converted to the child nodes are different. Thus, the candidate sentence node with a highest conversion probability may be selected as the response sentence node. In order to ensure the diversity of dialogues and avoid that the dialogues are limited to one kind of situation, in this embodiment, a random extraction may be performed on the candidate sentence nodes according to the conversion probabilities of the candidate sentence nodes, to obtain the response sentence node.

For example, it is assumed that the target user sentence node includes two candidate sentence nodes, that is, a smart device possesses two response approaches after the user expresses the dialogue semantics of the target user sentence node. Here, if the conversion probability of a first candidate sentence node is 60% and the conversion probability of a second candidate sentence node is 40%, in the process of a random extraction, the probability that the first candidate sentence node may be extracted is 60%, and the probability that the second candidate sentence node may be extracted is 40%.

S650, determining a second semantic encoding of the response sentence node.

In a specific embodiment of the present disclosure, since a sentence node in the dialogue tree generally has only one semantic encoding, the semantic encoding of the response sentence nodes is used as the second semantic encoding.

S660, finding a target response sentence node consistent with the second semantic encoding from the sentence tree.

In a specific embodiment of the present disclosure, after the response of the user information is determined, the specific representation form of the response may be determined. Specifically, the target response sentence node refers to a sentence node in the sentence tree that is capable of expressing response semantics. Matching is performed on the second semantic encoding and the semantic encoding of each sentence node in the sentence tree, and the sentence node having the matching semantic encoding is used as the target response sentence node.

S670, extracting, according to conversion probabilities of candidate word nodes having a combination relationship with the target response sentence node, target response word nodes from the candidate word nodes.

In a specific embodiment of the present disclosure, the target response word node refers to a word node, in the sentence tree, used for representing the semantics of the target response sentence node. There may be a plurality of candidate word nodes for representing the target response sentence node in the sentence tree. That is, the target response sentence node may include a plurality of child nodes, when the target response sentence node is a parent node, and each child node may include a plurality of child nodes. The target response word node is at least one of the candidate word nodes having the combination relationship with the target response sentence node.

Here, based on the statistics on the logical brain map sample, the conversion probabilities that the parent node is converted to the child nodes are different. Thus, the candidate word node with a highest conversion probability may be selected as the target response word node. In order to ensure the diversity of the dialogues and avoid that the dialogues are limited to one kind of situation, in this embodiment, a random extraction may be performed on the candidate word nodes according to the conversion probabilities of the candidate word nodes, to obtain the target response word node. In addition, in the range of word nodes expressing the second semantic encoding, the target response word node is extracted layer by layer according to the connection relationship between the word nodes.

For example, it is assumed that the target response sentence node is a parent node, and totally includes 5 layers of word nodes. It is further assumed that the target response sentence node has two semantic encodings, one of the semantic encodings matches the second semantic encoding, and the range of word nodes capable of expressing the matching semantic encoding is 3 layers of word nodes to which the parent node is connected. Therefore, the target response sentence node is taken as the parent node, and a first layer of word node to which the parent node is connected is first extracted. Second, the first layer of word node obtained through the extraction is taken as a parent node, a second layer of word node is extracted. Finally, the second layer of word node obtained through the extraction is taken as a parent node, a third layer of word node is extracted. The three word nodes are used as target response word nodes.

S680, combining the target response word nodes to obtain a target response sentence.

In a specific embodiment of the present disclosure, the target response sentence refers to a sentence that can express the semantics of the second semantic encoding and has a specific external word representation form. The target response sentence may be present in a form of text. The target response sentence is played to the user by the electronic device to respond to the user information of the user, thus implementing the dialogue with the user.

In this embodiment, the target word nodes may be combined according to the connection relationship between the target word nodes, to form the target response sentence. For example, in the above example, the first layer of word node, the second layer of word node and the third layer of word node are connected in an order from a parent node to a child node, and combined to form the target response sentence.

According to the technical solution of this embodiment, the semantics of the user information is identified through the traversal for the word nodes in the sentence tree, the response semantics is determined through the response relationship between the sentence nodes in the dialogue tree, and finally, the target response sentence is determined through the extraction for the word nodes in the sentence tree under the response semantics, to be used for the dialogue with the user. In this embodiment of the present disclosure, the dialogue logic is quickly learned into the sentence tree and the dialogue tree based on the logical brain map, and the response content takes into account the dialogue content of the preceding part of the dialogue through alternating matching between the sentence tree and the dialogue tree, and contains various representations of the dialogue content, and thus, the diversity of the dialogue content is ensured, and the accuracy of the multi-round dialogue between the user and the machine is improved.

Fourth Embodiment

Figure 7:
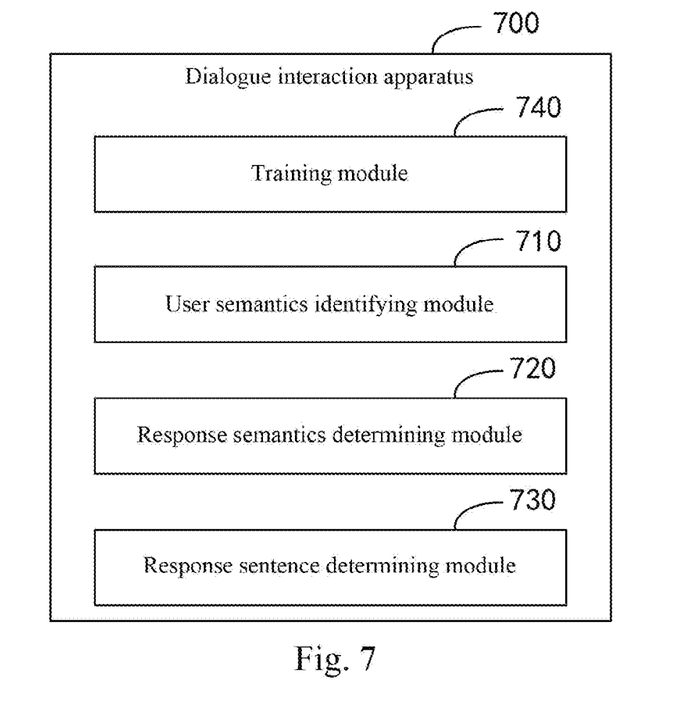
FIG. 7 is a schematic structural diagram of a dialogue interaction apparatus according to a fourth embodiment of the present disclosure.

FIG. 7 is a schematic structural diagram of a dialogue interaction apparatus according to a fourth embodiment of the present disclosure. This embodiment may be applicable to a situation where a response sentence is determined for a multi-round dialogue between a user and a machine. The apparatus may implement the dialogue interaction method described in any embodiment of the present disclosure. The apparatus 700 specifically includes: a user semantics identifying module 710, configured to determine a first semantic encoding of received user information according to a sentence tree; a response semantics determining module 720, configured to determine a second semantic encoding for responding to the user information from a dialogue tree according to the first semantic encoding, the sentence tree and the dialogue tree being trained and obtained through sentence node information and/or word node information in a logical brain map sample; and a response sentence determining module 730, configured to determine a target response sentence of the second semantic encoding from the sentence tree, to be used for a dialogue with a user.

Alternatively, the sentence tree is used to represent a combination relationship between a word and a sentence, and the dialogue tree is used to represent a response relationship between sentences in the dialogue.

Further, the apparatus 700 further includes a training module 740, configured to: learn and obtain a node in the sentence tree and a node in the dialogue tree according to the logical brain map sample; and determine, in the sentence tree and the dialogue tree, a conversion probability between nodes.

Alternatively, the training module 740 is configured to: perform a word node depth search on the logical brain map sample to obtain a complete dialogue path; constitute a dialogue dictionary according to word nodes in the complete dialogue path; perform sentence semantic compression on a sentence composed of words in the dialogue dictionary to generate a sentence node in the sentence tree, and obtain a combination of word nodes in the sentence node according to the dialogue dictionary; and add a semantic encoding identifying sentence semantics to the sentence node according to semantics of the combination of the word nodes in the sentence node.

Alternatively, the training module 740 is configured to: perform semantic compression on sentence nodes in the logical brain map sample to generate a sentence node in the dialogue tree; determine a response relationship between sentence nodes in the dialogue tree based on a dialogue logic represented by a connection relationship between sentence nodes in the logical brain map; and obtain the dialogue tree according to the sentence nodes and the response relationship between the sentence nodes, and add semantic encodings identifying sentence semantics to the sentence nodes according to semantics of the sentence nodes.

Alternatively, the user semantics identifying module 710 is configured to: traverse from a word node to a sentence node in the sentence tree according to word information of the user information, and determine a combination of target word nodes constituting the user information; and determine, from a sentence node to which the combination of the target word nodes belongs, the first semantic encoding for representing the user information, according to the combination of the target word nodes.

Alternatively, the response semantics determining module 720 is configured to: position and obtain, from the dialogue tree, a target user sentence node consistent with the first semantic encoding; extract and obtain, according to a conversion probability of a candidate sentence node having a response relationship with the target user sentence node, a response sentence node from the candidate sentence node; and determine the second semantic encoding of the response sentence node.

Alternatively, the response sentence determining module 730 is configured to: find a target response sentence node consistent with the second semantic encoding from the sentence tree; extract, according to conversion probabilities of candidate word nodes having a combination relationship with the target response sentence node, target response word nodes from the candidate word nodes; and combine the target response word nodes to obtain the target response sentence.

According to the technical solution of this embodiment, functions such as the construction for the logical brain map, the training for the sentence tree and the dialogue tree, the identification for the user semantics, the determination for the response semantics and the determination for the response sentence are implemented through the cooperation of the functional modules. In this embodiment of the present disclosure, the dialogue logic is quickly learned into the sentence tree and the dialogue tree based on the logical brain map, and the response content takes into account the dialogue content of the preceding part of the dialogue through alternating matching between the sentence tree and the dialogue tree, and contains various representations of the dialogue content, and thus, the diversity of the dialogue content is ensured, and the accuracy of the multi-round dialogue between the user and the machine is improved.

Fifth Embodiment

According to embodiments of the present disclosure, the present disclosure further provides an electronic device and a readable storage medium.

Figure 8:
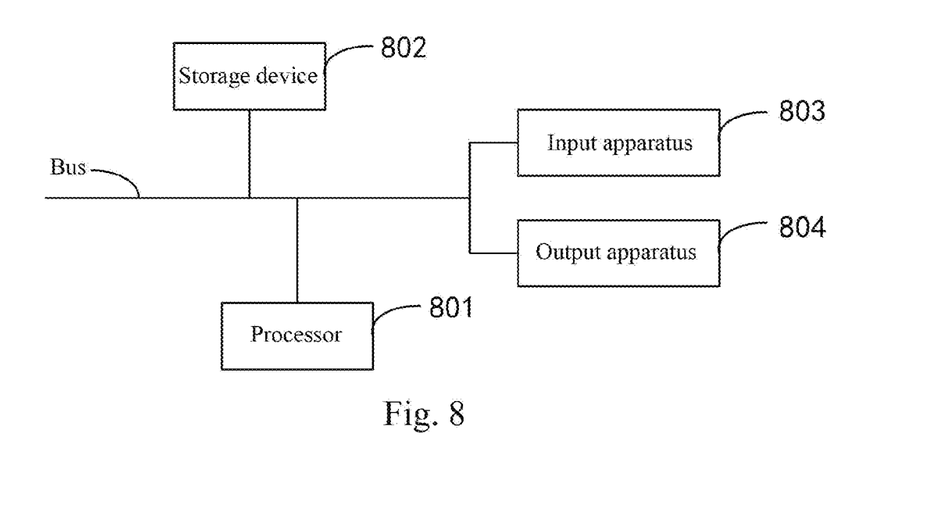
FIG. 8 is a block diagram of an electronic device adapted to implement a dialogue interaction method according to embodiments of the present disclosure.

As shown in FIG. 8, FIG. 8 is a block diagram of an electronic device for performing a dialogue interaction method according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 8, the electronic device includes one or more processors 801, a storage device 802, and an interface for connecting parts, the interface including a high speed interface and a low speed interface. The parts are interconnected using different buses, and may be mounted on a common motherboard or in other ways as needed. The processors may process an instruction executed within the electronic device, the instruction including an instruction stored in the storage device or on the storage device to display graphical information of a graphical user interface (GUI) on an external input/output apparatus such as a display device coupled to the interface. In other implementations, a plurality of processors and/or a plurality of buses may be used, if desired, along with a plurality of storage devices. Also, a plurality of electronic devices may be connected, and each device provides a portion of necessary operations (e.g., as a server array, a group of blade servers or a multi-processor system). In FIG. 8, one processor 801 is taken as an example.

The storage device 802 is a non-transitory computer readable storage medium provided in the present disclosure. Here, the storage device stores an instruction executable by at least one processor, to cause the at least one processor to perform the dialogue interaction method provided in the present disclosure. The non-transitory computer readable storage medium in the present disclosure stores a computer instruction, the computer instruction being used to cause a computer to perform the dialogue interaction method provided in the present disclosure.

As the non-transitory computer readable storage medium, the storage device 802 may be used to store a non-transitory software program, a non-transitory computer executable program and a module such as a program instruction/module (e.g., the user semantics identifying module 710, the response semantics determining module 720, the response sentence determining module 730 and the training module 740 shown in FIG. 7) corresponding to the dialogue interaction method in embodiments of the present disclosure. The processor 801 executes various functional applications and data processing of the server by running the non-transitory software program, the instruction and the module stored in the storage device 802, i.e., implements the dialogue interaction method in the above embodiments of the method.

The storage device 802 may include a storage program area and a storage data area. Here, the storage program area may store an operating system and an application program required for at least one function. The storage data area may store data, etc. created according to the use of the electronic device of the dialogue interaction method. In addition, the storage device 802 may include a high speed random access memory, and may also include a non-transitory storage device, for example, at least one magnetic disk storage device, a flash storage device, or other non-transitory solid state storage devices. In some embodiments, the storage device 802 may alternatively include a storage device disposed remotely relative to the processor 801. The remote storage device may be connected to the electronic device of the dialogue interaction method via a network. Examples of such network include, but not limited to, the Internet, an enterprise intranet, a local area network, a mobile communication network, and a combination thereof.

The electronic device of the dialogue interaction method may further include: an input apparatus 803 and an output apparatus 804. The processor 801, the storage device 802, the input apparatus 803 and the output apparatus 804 may be connected via a bus or in other ways. In FIG. 8, the connection via a bus is taken as an example.

The input apparatus 803 may receive an inputted number or inputted character information, and generate a key signal input related to the user setting and functional control of the electronic device of the dialogue interaction method. For example, the input apparatus is a touch screen, a keypad, a mouse, a track pad, a touch pad, a pointing stick, one or more mouse buttons, a track ball, a joystick, or the like. The output apparatus 804 may include a display device, an auxiliary lighting apparatus (e.g., a light emitting diode (LED)), a tactile feedback apparatus (e.g., a vibration motor), etc. The display device may include, but not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the Internet.

The computer system may include a client and a server. The client and the server are generally remote from each other and typically interact through the communication network. The relationship between the client and the server is generated through computer programs running on the respective computer and having a client-server relationship to each other.

According to the technical solution of embodiments of the present disclosure, a dialogue logic is quickly learned into a sentence tree and a dialogue tree based on a logical brain map, and response content takes into account the dialogue content of a preceding part of a dialogue through alternating matching between the sentence tree and the dialogue tree, and contains various representations of the dialogue content, and thus, the diversity of the dialogue content is ensured, and the accuracy of a multi-round dialogue between a user and a machine is improved.

In addition, through a sentence tree having a combination relationship and a dialogue tree having a response relationship, the response content takes into account the dialogue content of the preceding part of the dialogue, and contains the various representations of the dialogue content, and thus, various possibilities of the dialogue content are ensured.

In addition, node information and a conversion probability between nodes that are determined according to a logical brain map sample together constitute the sentence tree and the dialogue tree, such that the nodes in the trees have a dialogue logic, and the various representations of the dialogue content are contained, and thus, the various possibilities of the dialogue content are ensured.

In addition, a word in a dialogue dictionary constructed based on the logical brain map sample constitutes a word node in the sentence tree, and semantics expressed by a combination of word nodes constitutes a sentence node. Based on different approaches to combine the word nodes, the sentence node may contain different sentence semantics, and thus, each kind of sentence semantics is configured with a corresponding semantic encoding, which is conductive to identifying user information of different representations and conductive to a plurality of representations of the same semantics, thereby ensuring the diversity of dialogues.

In addition, sentence semantics compressed based on the logical brain map sample constitutes a sentence node in the dialogue tree, and a semantic encoding is added to each sentence node. A response relationship between sentence nodes in the dialogue tree is determined based on the dialogue logic in the logical brain map, and the corresponding relationship of the semantics is conductive to determining the dialogue logic between utterances in the dialogue, and is not limited to the representation of a word in a sentence.

In addition, by matching the word information in the user information and the sentence node in the sentence tree, a combination of target word nodes conforming to the word information is determined, such that the first semantic encoding of the sentence node to which the combination of the target word nodes belongs is determined, thereby implementing the semantic identification for the user information.

In addition, based on the first semantic encoding, a sentence node is positioned in the dialogue tree, such that the second semantic encoding responding to the user information is determined according to a response relationship between sentence nodes. Therefore, it is implemented that the response semantics is determined on the basis of the dialogue logic, and the limitation of the word representation on the dialogue and the neglect of the preceding part of the dialogue are avoided, thus ensuring the diversity and accuracy of dialogues.

In addition, a target response sentence node is determined from the sentence tree according to the second semantic encoding as the response semantics, a combination of words expressing the second semantics is determined according to the second semantic encoding, and finally, a target response sentence is formed to be used for the dialogue. In the situation where the semantics is correctly expressed, the diversity of dialogues is ensured.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

The above embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A dialogue interaction method, applied in an intelligent device with a dialogue function, comprising:
   receiving voice information input by a user, and converting the voice information to a text for using as user information;
   determining a first semantic encoding of the user information according to a sentence tree;
   determining a second semantic encoding for responding to the user information from a dialogue tree according to the first semantic encoding, the sentence tree and the dialogue tree being trained and obtained through sentence node information and/or word node information in a logical brain map sample, the dialogue tree comprising a plurality of groups of dialogues, and each group of dialogues corresponding to a dialogue logic and comprising a plurality of layers of dialogue semantics, wherein each layer of dialogue semantics corresponds to a single sentence corresponding to a sentence node of the logic brain map sample, and the sentences corresponding to the plurality of layers of dialogue semantics have a response relationship between any two sentences;
   determining a target response sentence of the second semantic encoding from the sentence tree; and
   converting the target response sentence to target voice information for outputting to the user through the intelligent device,
   wherein the determining a second semantic encoding for responding to the user information from the dialogue tree according to the first semantic encoding comprises:
   positioning, in the dialogue tree, a target user sentence node consistent with the first semantic encoding, the target user sentence node corresponding to a layer of dialogue semantics in the dialogue tree:
   determining at least one candidate sentence node, in the dialogue tree, having a response relationship with the target sentence node, and extracting a response sentence node, from the at least one candidate sentence node, according to a conversion probability of the candidate sentence node; and
   determining the second semantic encoding of the response sentence node.

2. The method according to claim 1, wherein the sentence tree is used to represent a combination relationship between a word and a sentence.

3. The method according to claim 1, wherein the sentence tree and the dialogue tree are determined by:
   learning and obtaining a node in the sentence tree and a node in the dialogue tree according to the logical brain map sample; and
   determining, in the sentence tree and the dialogue tree, a conversion probability between nodes.

4. The method according to claim 3, wherein learning and obtaining the node in the sentence tree according to the logical brain map sample comprises:
   performing a word node depth search on the logical brain map sample to obtain a complete dialogue path;
   constituting a dialogue dictionary according to word nodes in the complete dialogue path;
   performing sentence semantic compression on a sentence composed of words in the dialogue dictionary to generate a sentence node in the sentence tree, and obtaining a combination of word nodes in the sentence node according to the dialogue dictionary; and
   adding a semantic encoding identifying sentence semantics to the sentence node according to semantics of the combination of the word nodes in the sentence node.

5. The method according to claim 3, wherein learning and obtaining the node in the dialogue tree according to the logical brain map sample comprises:
   performing semantic compression on sentence nodes in the logical brain map sample to generate a sentence node in the dialogue tree;
   determining a response relationship between sentence nodes in the dialogue tree based on a dialogue logic represented by a connection relationship between sentence nodes in the logical brain map; and
   obtaining the dialogue tree according to the sentence nodes and the response relationship between the sentence nodes, and adding a semantic encoding identifying sentence semantics to the sentence nodes according to semantics of the sentence nodes.

6. The method according to claim 1, wherein the determining a first semantic encoding of received user information according to a sentence tree comprises:
   traversing from a word node to a sentence node in the sentence tree according to word information of the user information, and determining a combination of target word nodes constituting the user information; and
   determining, from a sentence node to which the combination of the target word nodes belongs, the first semantic encoding for representing the user information, according to the combination of the target word nodes.

7. The method according to claim 1, wherein the determining a target response sentence of the second semantic encoding from the sentence tree comprises:
finding a target response sentence node consistent with the second semantic encoding from the sentence tree;
extracting, according to conversion probabilities of candidate word nodes having a combination relationship with the target response sentence node, target response word nodes from the candidate word nodes; and
combining the target response word nodes to obtain the target response sentence.

8. An electronic device with a dialogue function, comprising:
at least one processor; and
a storage device, communicatively connected with the at least one processor, wherein the storage device stores an instruction executable by the at least one processor, and the instruction is executed by the at least one processor, to cause the at least one processor to perform operations, the operations comprising:
receiving voice inform receiving voice information input by a user, and converting the voice information to a text for using as user information;
determining a first semantic encoding of the user information according to a sentence tree;
determining a second semantic encoding for responding to the user information from a dialogue tree according to the first semantic encoding, the sentence tree and the dialogue tree being trained and obtained through sentence node information and/or word node information in a logical brain map sample, the dialogue tree comprising a plurality of groups of dialogues, and each group of dialogues corresponding to a dialogue logic and comprising a plurality of layers of dialogue semantics, wherein each layer of dialogue semantics corresponds to a single sentence corresponding to a sentence node of the logic brain map sample, and the sentences corresponding to the plurality of layers of dialogue semantics have a response relationship between any two sentences;
determining a target response sentence of the second semantic encoding from the sentence tree; and
converting the target response sentence to target voice information for outputting to the user through the electronic device,
wherein the determining a second semantic encoding for responding to the user information from the dialogue tree according to the first semantic encoding comprises:
positioning, in the dialogue tree, a target user sentence node consistent with the first semantic encoding, the target user sentence node corresponding to a layer of dialogue semantics in the dialogue tree;
determining at least one candidate sentence node, in the dialogue tree, having a response relationship with the target sentence node, and extracting a response sentence node, from the at least one candidate sentence node, according to a conversion probability of the candidate sentence node; and
determining the second semantic encoding of the response sentence node.

9. The electronic device according to claim 8, wherein the sentence tree is used to represent a combination relationship between a word and a sentence.

10. The electronic device according to claim 8, wherein the sentence tree and the dialogue tree are determined by:
learning and obtaining a node in the sentence tree and a node in the dialogue tree according to the logical brain map sample; and
determining, in the sentence tree and the dialogue tree, a conversion probability between nodes.

11. The electronic device according to claim 10, wherein learning and obtaining the node in the sentence tree according to the logical brain map sample comprises:
performing a word node depth search on the logical brain map sample to obtain a complete dialogue path;
constituting a dialogue dictionary according to word nodes in the complete dialogue path;
performing sentence semantic compression on a sentence composed of words in the dialogue dictionary to generate a sentence node in the sentence tree, and obtaining a combination of word nodes in the sentence node according to the dialogue dictionary; and
adding a semantic encoding identifying sentence semantics to the sentence node according to semantics of the combination of the word nodes in the sentence node.

12. The electronic device according to claim 10, wherein learning and obtaining the node in the dialogue tree according to the logical brain map sample comprises:
performing semantic compression on sentence nodes in the logical brain map sample to generate a sentence node in the dialogue tree;
determining a response relationship between sentence nodes in the dialogue tree based on a dialogue logic represented by a connection relationship between sentence nodes in the logical brain map; and
obtaining the dialogue tree according to the sentence nodes and the response relationship between the sentence nodes, and adding a semantic encoding identifying sentence semantics to the sentence nodes according to semantics of the sentence nodes.

13. The electronic device according to claim 8, wherein the determining a first semantic encoding of received user information according to a sentence tree comprises:
traversing from a word node to a sentence node in the sentence tree according to word information of the user information, and determining a combination of target word nodes constituting the user information; and
determining, from a sentence node to which the combination of the target word nodes belongs, the first semantic encoding for representing the user information, according to the combination of the target word nodes.

14. The electronic device according to claim 8, wherein the determining a target response sentence of the second semantic encoding from the sentence tree comprises:
finding a target response sentence node consistent with the second semantic encoding from the sentence tree;
extracting, according to conversion probabilities of candidate word nodes having a combination relationship with the target response sentence node, target response word nodes from the candidate word nodes; and
combining the target response word nodes to obtain the target response sentence.

15. A non-transitory computer readable storage medium, applied in an intelligent device with a dialogue function and storing a computer instruction, wherein the computer instruction is used to cause a computer to perform operations, the operations comprising:
receiving voice information input by a user, and converting the voice information to a text for using as user information;

determining a first semantic encoding of the user information according to a sentence tree;
determining a second semantic encoding for responding to the user information from a dialogue tree according to the first semantic encoding, the sentence tree and the dialogue tree being trained and obtained through sentence node information and/or word node information in a logical brain map sample, the dialogue tree comprising a plurality of groups of dialogues, and each group of dialogues corresponding to a dialogue logic and comprising a plurality of layers of dialogue semantics, wherein each layer of dialogue semantics corresponds to a single sentence corresponding to a sentence node of the logic brain map sample, and the sentences corresponding to the plurality of layers of dialogue semantics have a response relationship between any two sentences;
determining a target response sentence of the second semantic encoding from the sentence tree; and
converting the target response sentence to target voice information for outputting to the user through the intelligent device,
wherein the determining a second semantic encoding for responding to the user information from the dialogue tree according to the first semantic encoding comprises:
positioning, in the dialogue tree, a target user sentence node consistent with the first semantic encoding, the target user sentence node corresponding to a layer of dialogue semantics in the dialogue tree;
determining at least one candidate sentence node, in the dialogue tree, having a response relationship with the target sentence node, and extracting a response sentence node, from the at least one candidate sentence node, according to a conversion probability of the candidate sentence node; and
determining the second semantic encoding of the response sentence node.

\* \* \* \* \*